US010095674B2

(12) United States Patent
Levien

(10) Patent No.: US 10,095,674 B2
(45) Date of Patent: Oct. 9, 2018

(54) MAINTAINING STATE OF DOCUMENT CONCURRENTLY EDITED BY TWO COMPUTING SYSTEMS BY DETERMINING LOCATIONS OF EDITS BASED ON INVERSE TRANSFORMATIONS

(71) Applicant: Google Inc., Mountain View, CA (US)

(72) Inventor: Raphael Levien, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 39 days.

(21) Appl. No.: 15/205,283

(22) Filed: Jul. 8, 2016

(65) Prior Publication Data

US 2018/0011825 A1    Jan. 11, 2018

(51) Int. Cl.
 *G06F 17/24* (2006.01)
 *G06F 17/30* (2006.01)
 *G06F 17/22* (2006.01)

(52) U.S. Cl.
 CPC .......... *G06F 17/24* (2013.01); *G06F 17/2288* (2013.01); *G06F 17/30011* (2013.01)

(58) Field of Classification Search
 CPC ...................................... G06F 17/24
 USPC ......................................... 715/229
 See application file for complete search history.

(56) References Cited

U.S. PATENT DOCUMENTS

2006/0161516 A1* 7/2006 Clarke .............. G06F 17/30578
2015/0199270 A1* 7/2015 Day-Richter ....... G06F 12/0253
  707/816

OTHER PUBLICATIONS

Ahmed-Nacer et al., "Merging OT and CRDT Algorithms", 1st Workshop on Principles and Practice of Eventual Consistency, Apr. 2014, 4 pages.
Attiya et al., "Specification and Complexity of Collaborative Text Editing", available online at <http://software.imdea.org/~gotsman/papers/editing-podc16.pdf>, Jul. 25-28, 2016, 10 pages.
Ellis et al., "Concurrency Control in Groupware Systems", available online at <https://www.lri.fr/~mbl/ENS/CSCW/2012/papers/Ellis-SIGMOD89.pdf>, 1989, pp. 399-407.
Imine et al., "Formal Design and Verification of Operational Transformation Algorithms for Copies Convergence", Theoretical Computer Science, vol. 351, 2006, pp. 167-183.

(Continued)

*Primary Examiner* — Frank D Mills
(74) *Attorney, Agent, or Firm* — Brake Hughes Bellermann LLP

(57) ABSTRACT

A non-transitory computer-readable storage medium may comprise instructions stored thereon. The instructions, when executed by at least one processor, may be configured to cause the first computing system to at least generate a collection of inverse transformations of an index of the document, the collection of inverse transformations being based on at least one asymmetric local edit to the document by the first computing system, determine a location within the document to perform a remote edit by the second computing system based on the collection of inverse transformations of the index of the document, perform the remote edit to the document at the determined location based on the remote edit by the second computing system, and perform at least one local edit to the document based on the at least one asymmetric local edit to the document by the first computing system.

21 Claims, 11 Drawing Sheets

(56) References Cited

OTHER PUBLICATIONS

Levlen, Raph, "Towards a unified theory of Operational Transformation and CRDT", available online at <https://medium.com/@raphlinus/towards-a-unified-theory-of-operational-transformation-and-crdt-70485876f72f#.8x1vk4g3v>, retrieved on Jul. 12, 2016, 8 pages.

Nichols et al., "High-Latency, Low-Bandwidth Windowing in the Jupiter Collaboration System", Proceedings of the 8th Annual ACM Symposium on User Interface and Software Technology, 1995, 10 pages.

Oster et al., "Real Time Group Editors Without Operational Transformation", available online at <https://hal.inria.fr/inria-00071240/document>, 2005, 28 pages.

Oster et al., "Tombstone Transformation Functions for Ensuring Consistency in Collaborative Editing Systems", available online at <http://www.loria.fr/~urso/uploads/Main/oster06collcom.pdf>, 2006, pp. 1-10.

Randolph et al., "On Consistency of Operational Transformation Approach", EPTCS, vol. 107, 2013, pp. 45-49.

Suleiman et al., "Serialization of Concurrent Operations in a Distributed Collaborative Environment", Proceedings of the International ACM SIGGROUP Conference on Supporting Group Work: The Integration Challenge, 1997, pp. 435-445.

Sun et al., "Achieving Convergence, Causality Preservation, and Intention Preservation in Real-Time Cooperative Editing Systems", ACM Transactions on Computer-Human Interaction, vol. 5, No. 1, Mar. 1998, pp. 63-108.

Sun et al., "Context-Based Operational Transformation in Distributed Collaborative Editing Systems", IEEE Transactions on Parallel and Distributed Systems, vol. 20, No. 10, Oct. 2009, pp. 1454-1470.

Sun et al., "Operational Transformation in Real-Tine Group Editors: Issue, Algorithms, and Achievements", Proceedings of ACM Conference on Computer-Supported Cooperative Work, Nov. 14-18, 1998, pp. 59-68.

Sun et al., "Reversible Inclusion and Exclusion Transformation for String-Wise Operations in Cooperative Editing Systems", Proceedings of the 21st Australasian Computer Science Conference, 1998, 12 pages.

Vidot et al., "Copies Convergence in a Distributed Real-Time Collaborative Environment", Proceedings of the ACM Conference on Computer Supported Cooperative Work, Dec. 2-6, 2000, pp. 171-180.

Weiss et al., "A Flexible Undo Framework for Collaborative Editing", [Research Report] RR-6516, INRIA, 2008, 27 pages.

Wikipedia, "Conflict-Free Replicated Data type", available online at <https://en.wikipedia.org/wiki/Conflict-free_replicated_data_type>, retrieved on Jun. 28, 2016, 7 pages.

Wikipedia, "Operational Transformation", available online at <https://en.wikipedia.org/wiki/Operational_transformation>, retrieved on Jun. 28, 2016, 13 pages.

Li et al., "A Lightweight Operational Transformation Approach", available online at <http://citeseerx.ist.psu.edu/viewdoc/download;jsessionid=14FE1A4FB14C4BCD27F6F75E781AE574?doi=10.1.1.117.7078&rep=rep1&type=pdf>, downloaded from the web Jun. 29, 2016, 10 pages.

\* cited by examiner

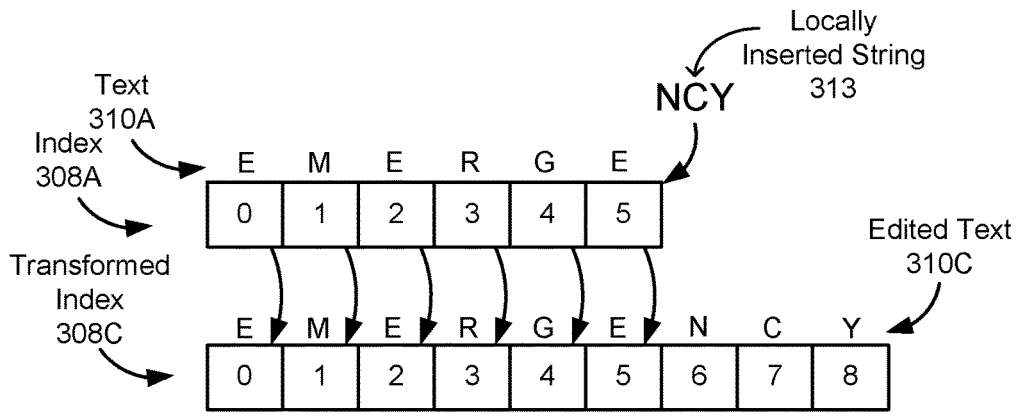
FIG. 3D
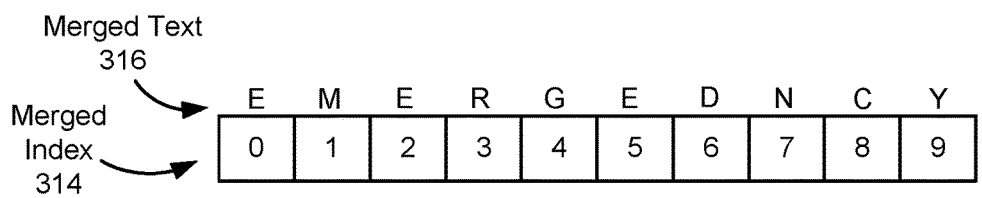
FIG. 3E
```
Edit Data
Structure
   400
Declaration
   402
        Struct Edit {
                ID_type       id;  ← Reference 404
                pri_type priority;  ← Priority 406
                Set<uint>ins;  ← Insertion position 408
                Set<uint>del;  ← Deletion position 410
        }
```
FIG. 4

MAINTAINING STATE OF DOCUMENT CONCURRENTLY EDITED BY TWO COMPUTING SYSTEMS BY DETERMINING LOCATIONS OF EDITS BASED ON INVERSE TRANSFORMATIONS

TECHNICAL FIELD

This description relates to concurrent computing.

BACKGROUND

Documents may be edited concurrently by multiple users. At times, a user may apply an edit to a document before a computing system associated with the user has recognized an edit to the document applied by another user.

SUMMARY

According to one example, a non-transitory computer-readable storage medium may comprise instructions stored thereon for maintaining a current state of a document that is concurrently being edited by at least a first user associated with a first computing system and a second user associated with a second computing system. The instructions, when executed by at least one processor, may be configured to cause the first computing system to at least generate a collection of inverse transformations of an index of the document, the collection of inverse transformations being based on at least one asymmetric local edit to the document by the first computing system, determine a location within the document to perform a remote edit by the second computing system based on the collection of inverse transformations of the index of the document, perform the remote edit to the document at the determined location based on the remote edit by the second computing system, and perform at least one local edit to the document based on the at least one asymmetric local edit to the document by the first computing system.

According to another example, non-transitory computer-readable storage medium comprising instructions stored thereon for maintaining a current state of a document that is concurrently being edited by at least a first user associated with a first computing system and a second user associated with a second computing system. The instructions, when executed by at least one processor, being configured to cause the first computing system to at least, for each of multiple remote edits of the document received from the second computing system that have not already been applied the document by the first computer, for each of multiple local edits to the document performed by the first computing system, determine whether the local edit to the document performed by the first computing system has been recognized by the second computing system and if the local edit to the document performed by the first computing system has not been recognized by the second computing system, add an inverse transformation of the local edit to the document performed by the first computing system to a collection of unrecognized edits, and apply the remote edit to the document at a location determined based on based on an original location of the remote edit and the inverse transformations included in the collection of unrecognized edits.

According to another example, a method for maintaining a current state of a document that is concurrently being edited by at least a first user associated with a first computing system and a second user associated with a second computing system may comprise the first computing system performing at least generating a collection of inverse transformations of an index of the document, the collection of inverse transformations being based on at least one asymmetric local edit to the document by the first computing system, determining a location within the document to perform a remote edit by the second computing system based on the collection of inverse transformations of the index of the document, performing the remote edit to the document at the determined location based on the remote edit by the second computing system, and performing at least one local edit to the document based on the at least one asymmetric local edit to the document by the first computing system.

The details of one or more implementations are set forth in the accompanying drawings and the description below. Other features will be apparent from the description and drawings, and from the claims.

BRIEF DESCRIPTION OF THE DRAWINGS

FIG. 3D shows an index and a transformed index after a string has been inserted according to an example implementation.

FIG. 3E shows an index and text after insertions have been merged according to an example implementation.

FIG. 4 shows an edit data structure according to an example implementation.

DETAILED DESCRIPTION

To maintain a current state of a document that is concurrently being edited by at least a first user associated with a first computing system and a second user associated with a second computing system, the first computing system may generate a collection of inverse transformations to an index of the document. The inverse transformations may be based on local edits performed by the first computing system, and the collection may include asymmetric local edits, which may be local edits that have not been recognized by the second computing system. The inverse transformations may include changes to offsets or indices identifying locations within the document, and may not reference any other object within the collection. The first computing system may determine a location within the document to perform a remote edit performed by the second computing system based on the collection of inverse transformations. The first computing system may perform the remote edit at the determined location, and thereafter perform the asymmetric local edit. By maintaining the collection of inverse transformations, which includes offsets and does not include references to other objects in the collection, the first computing system may minimize a number of computations and memory usage, thereby minimizing computing resources required to maintain the current state of the document.

Figure 1A:
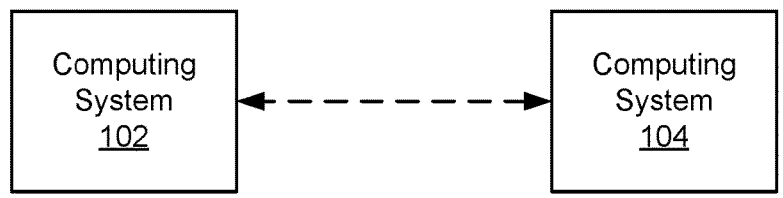
FIG. 1A is a network diagram showing a first computing system and a second computing system according to an example implementation.

FIG. 1A is a network diagram showing a first computing system 102 and a second computing system 104 according to an example implementation. A first user associated with the first computing system 102 and a second user associated with the second computing system 104 may be concurrently editing a document, such as inserting strings of characters into and/or deleting strings of characters from the document. When each computing system 102, 104 edits the document, the computing system 102, 104 may send a signal, such as a packet, to the other computing system 102, 104, indicating the edit, so that the other computing system 102, 104 can update its version of the document.

At times, the computing systems 102, 104 may both make edits to the document at nearly the same time, and/or before the other computing system 102, 104 has received, seen, or recognized the edit and/or updated its version of the document, causing the respective versions of the document to be asymmetrical. The computing systems 102, 104 may determine whether the other computing system 102, 104 has received, seen, or recognized the edit and/or updated its version of the document based on receiving an acknowledgment of the edit from the other computing system 102, 104 based on a most recent state of the document received from the other computing system 102, 104, or based on an elapsed time since sending the edit to the other computing system 102, 104.

Figure 1B:
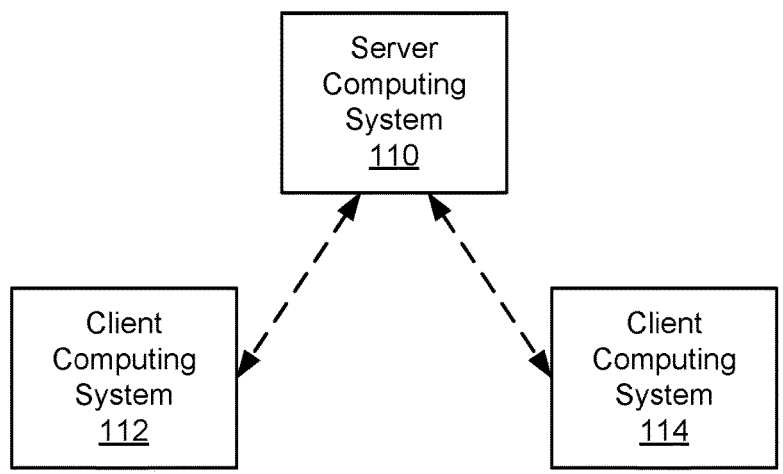
FIG. 1B is a network diagram showing a server computing system, a first client computing system, and a second client computing system according to an example implementation.

FIG. 1B is a network diagram showing a server computing system 110, a first client computing system 112, and a second client computing system 114 according to an example implementation. A first user associated with the first client computing system 112 and a second user associated with the second client computing system 114 may be concurrently editing a document, as discussed above, via the server computing system 110. The client computing systems 112, 114 may maintain their own local versions of the document, or may receive data to present a recent version of the document from the server computing system via a networking protocol such as Hypertext Transfer Protocol (HTTP). The server computing system 110 may maintain a current version of the document, and may send and receive edits to the document to the client computing systems 112, 114. The client computing systems 112, 114 may interface with the server computing system 110 in a similar manner as the computing systems 102, 104 interface as discussed above with respect to FIG. 1A. The server computing system 110 may interface with each of the client computing systems 112, 114 in a similar manner as the computing systems 102, 104 interface with each other as discussed above with respect to FIG. 1A, with the exception that edits sent by the server computing system 110 to one of the client computing systems 112, 114 originate from the other client computing system 112, 114.

Figure 2:
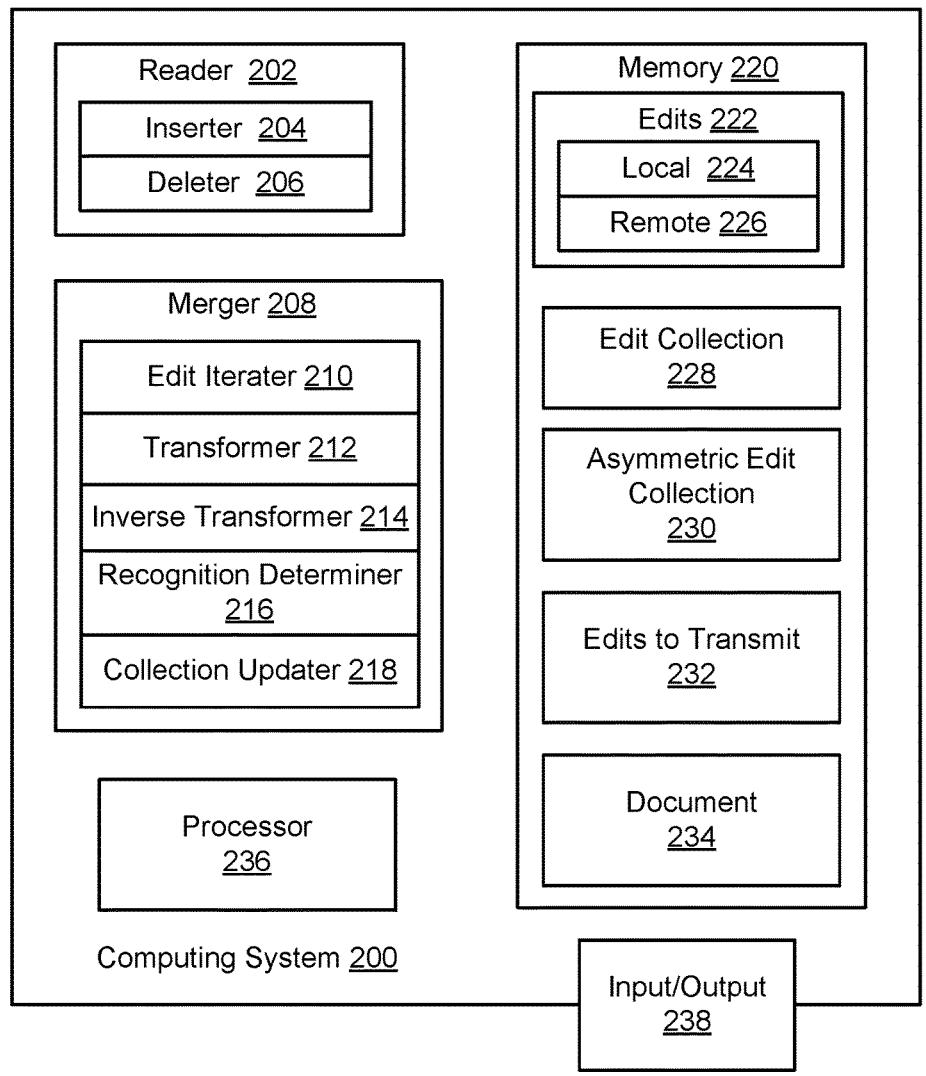
FIG. 2 is a block diagram showing a computing system according to an example implementation.

FIG. 2 is a block diagram showing a computing system 200 according to an example implementation. The computing system 200 may represent any of the computing systems 102, 104, 110, 112, 114 described above. As described herein, a "first computing system" or "local computing system" may be used to refer to the computing system 200, a "second computing system" or "remote computing system" may be used to refer to a computing system 102, 104, 110, 112, 114 interfacing with the computing system 200, "local edits" may refer to edits performed by the computing system 200, and "remote edits" may refer to edits performed by a computing system 102, 104, 110, 112, 114 interfacing with the computing system 200 and received by the computing system 200. For example, the first computing system 102 may perform local edits on its stored version of the document and send the local edits to the second computing system 104, and receive remote edits from the second computing system 104 and apply the remote edits to the version of the document stored on the first computing system 102. In another example, the first client computing system 112 may perform local edits on its stored version of the document and send the local edits to the server computing system 110, and receive remote edits from the server computing system 110 (which received the remote edits from the second client computing system 114) and apply the remote edits to the version of the document stored on the first client computing system 112. In another example, the server computing system 110 may perform local edits (which were received from the first client computing system 112) on its stored version of the document and send the local edits to the second client computing system 114, and receive remote edits from the second client computing system 114 an apply the remote edits to the version of the document stored on the server computing system 110.

The computing system 200 may include a reader 202. The reader 202 may perform remote edits, such as insertions of strings and/or deletions of strings, received by the (first) computing system 200 from the second computing system. The reader 202 may determine a location to perform the remote edits by tracking insertions and deletions separately.

The reader 202 may include an inserter 204. The inserter 204 may insert remote inserts (inserts received from the remote computing system). The inserter 204 may compute deletions and changes to an index of the document caused by the deletions, insert the character(s) and/or string at a location based on the received insertion and the changed index, and append the insertion with a unique identifier, a priority, an identifier of a location or index of the insertion and an indicator that the edit is not a deletion.

The reader 202 may include a deleter 206. The deleter 206 may delete remote deletions (deletions received from the remote computing system). The deleter 206 may compute deletions and changes to an index of the document caused by the deletions, and append the insertion with a unique identifier, a priority, an indicator that the edit is not an insertion, and an identifier of a location or index of the deletion.

The computing system 200 may include a merger 208. The merger 208 may merge edits to the document from two or more computing systems 102, 104, 110, 112, 114. When edits to the document from different computing systems 102, 104, 110, 112, 114 are sufficiently spaced apart in time that each computing system 102, 104, 110, 112, 114 has recognized and/or processed edits by the other computing system 102, 104, 110, 112, 114 before receiving edit input from the user associated with the computing system 102, 104, 110, 112, 114, the edits may be symmetrical and the merging may include the computing system 102, 104, 110, 112, 114 applying and/or performing the edits sequentially in time, without having to reverse any transformations to the index and/or perform index transformations to the index. When edits to the document from different computing systems 102, 104, 110, 112, 114 are closer in time and are received from an other computing system 102, 104, 110, 112, 114 before the other computing system has recognized and/or processed edits received by the respective computing system 102, 104, 110, 112, 114, the edits may be asymmetrical and the locations of the edits may be more difficult to determine, because the locations of edits by different computing systems 102, 104, 110, 112, 114 may be based on offsets or indices that do not take into account edits by another computing system 102, 104, 110, 112, 114.

The merger 208 may include an edit iterator 210. The edit iterator 210 may perform a series of operations for each edit received from an "other" or second computer (with the computing system 200 considered the "first" computing system). The edit iterator 210 may, for example, determine whether the computing system 200 has already received, processed, and/or applied the edit to the document. The edit iterator 210 may initialize collections, such as collections of all edits performed by the computing system 200 ("S"), all asymmetrical edits performed by the computing system 200 (edits that have not been seen, recognized, and/or processed by the second computing system) ("T"), and/or edits that the computing system 200 should send to the second computing system ("ins_list"). The collections may, for example, be unordered sets, or may order the edits in chronological order based on the chronological order of adding the edits to the collection, such as a stack that removes the edits in an opposite order of addition ("first in last out") or a queue that removes the edits in a same order of addition ("first in first out"). The collections may also be stored in data structures such as balanced binary trees, B-trees, or similar data structures which continue to provide efficient access to the elements of the collection even as the size of the collection increases.

For each edit received from the second computer, the edit iterator 210 may iterate through edits performed by the first computing system 200. The edit iterator 210 may iterate through edits performed by the first computing system 200 so that the index within the document may be reversed from the edits performed by the first computing system 200 to apply the edits performed by the second computing system in correct locations based on indices, locations, or offsets included in the edits received from the second computing system.

The merger 208 may include a transformer 212. The transformer 212 may perform transformations of indices based on edits, such as insertions and deletions. The transformer 212 may transform indices based on insertions by increasing the index value of indices after a location of an insert by a length of an inserted string. The transformer 212 may, for example, determine a transformation of the collection S (all edits performed by the computing system 200) based on the present edit called by the edit iterator 210.

The merger 208 may also include an inverse transformer 214. The inverse transformer may perform inverse transformations based on edits to return the indices to their values before the edits. For example, for an inverse transformation of an insertion, the inverse transformer 214 may reduce the values of indices after the location of the insertion by a value based on the length of the inserted string.

The merger 208 may include a recognition determiner 216. The recognition determiner 216 may determine whether the present edit has been seen, processed, and/or recognized by the second computing system. The recognition determiner 216 may determine whether the present edit has been seen, processed, and/or recognized by the second computing system based on whether the computing system 200 has received an acknowledgment from the second computing system, whether a predetermined time period has elapsed since the computing system 200 sent the edit to the second computing system, and/or whether a version of the document received from the second computing system includes the edit, according to example implementations. If the recognition determiner 216 determines that the present edit has been seen, processed, and/or recognized by the second computing system, then the present edit may be considered symmetric. If the recognition determiner 216 determines that the present edit has not been seen, processed, and/or recognized by the second computing system, then the present edit may be considered an asymmetric edit.

The merger 208 may also include a collection updater 218. The collection updater 218 may add transformations and/or inverse transformations to collections, such as sets, stacks, and/or queues. The collection updater 218 may, for example, add inverse transformations of the present edit performed by the computing system 200 to ins_list (edits that the computing system 200 should send to the second computing system) if the recognition determiner 216 determines that the second computing system has not recognized the edit, add the transformation of the present edit performed by the computing system 200 to T (asymmetrical edits and/or edits performed by the computing system 200 that have not been seen, recognized, and/or processed by the second computing system) if the recognition determiner 216 determines that the second computing system has not recognized the edit, and/or add the transformation of the present edit performed by the computing system 200 to S (all edits performed by the computing system 200). The objects, transformations, and/or inverse transformations added to collections by the collection updater 218 need not include any references to other objects, transformations, and/or inverse transformations, reducing a number of procedures to perform and memory to occupy.

The edit iterator 210 may call the recognition determiner 216 to determine whether the present edit has been recognized by the second computing system and/or whether the present edit is an asymmetric edit. If the present edit has not been recognized by the second computing system and/or the present edit is an asymmetric edit, then the collection updater 218 may add inverse transformations of the present edit performed by the computing system 200 to ins_list (edits that the computing system 200 should send to the second computing system) and add the transformation of the present edit performed by the computing system 200 to T (edits performed by the computing system 200 that have not been seen, recognized, and/or processed by the second computing system). Regardless of whether the present edit was recognized by the second computing system, the collection updater 218 may add the transformation of the present edit performed by the computing system 200 to S (all edits performed by the computing system 200).

After iterating over the local edits performed by the computing system 200, the merger 208 may, for each remote edit performed by the second computing system, perform a forward transformation of the indices by reversing the transformations in ins_list in reverse order and/or performing inverse transformations on the indices based on the inverse transformations included in ins_list in reverse order, and then perform the remote edit received from the second computing system. After performing the remote edits received from the second computing system, the computing system 200 may perform the local edits applied by the computing system 200, with the resulting document including the edits performed by both the first computing system 200 and the second computing system. By performing the transformations and inverse transformations, and utilizing the transformations and inverse transformations in collections without any references to the other transformations and inverse transformations, the merger may reduce the number of procedures and/or iterations from O(n) in merge operations such as described by Chengzheng Sun and Clarence Ellis in "Operational Transformation in Real-Time Group Editors: Issues, Algorithms, and Achievements" (Proc. of 1998 ACM Conference on Computer-Supported Cooperative Work, Seattle, USA, Nov. 14-18, 1998, pp. 59-68), to O(log(n)), where n is the number of asymmetric local edits and/or local edits performed by this computing system 200 which have not been recognized by the second computing system.

The computing system 200 may include memory 220. The memory 220 may store any of the data generated by, and/or utilized by, any combination of the functions, methods, and techniques described herein.

The memory 220 may store edits 222. The edits 222 may be changes to a document 234, such as insertions and/or deletions of strings of characters. The edits 222 may be stored as data structures shown and described with respect to FIG. 4. The edits 222 may include local edits 224 performed by a first user of the first or local computing system 200, and remote edits 226 performed by a second user of a second or remote computing system which interfaces with the first computing system 200.

The memory 220 may store an edit collection 228. The edit collection 228 may include all edits by the first computing system 200 and the second computing system, and may be referred to as S.

The computing system 200 may store an asymmetric edit collection 230. The asymmetric edit collection 230 may include local edits performed by the first computing system 200 that the recognition determiner 216 determines have not been recognized by the second or remote computing system, and may be referred to as T.

The computing system 200 may store edits to transmit 232. The edits to transmit 232, which may be referred to as ins_list, may include local edits performed by the user of the first computing system 200 that the merger 208 determines should be transmitted to the second computing system.

The memory 220 may also store the document 234. The document 234 may include characters, and may reflect the sum of all edits to the document 234.

The memory 220 may include a non-transitory computer-readable storage medium storing instructions thereon that, when executed by at least one processor, such as a processor 236, are configured to cause a computing system, such as the computing system 200, to perform any combination of the functions, methods, and techniques described herein.

The computing system 200 may include the processor 236. The processor 236 may include one or more processors, such as microprocessors, or embedded systems. The processor 236 may, by executing instructions stored in memory 220, perform any combination of the functions, methods, and techniques described herein.

The computing system 200 may include one or more input/output nodes 238. The input/output nodes 238 may receive input from a user, such as via a keyboard, mouse, and/or touchscreen, as well as from other computing systems 102, 104, 110, 112, 114, such as via one or more wired or wireless interfaces. The input/output nodes 238 may also provide output to a user, such as via a screen or monitor, printer, or speaker, as well as to other systems 102, 104, 110, 112, 114, such as via one or more wired or wireless interfaces.

Figure 3A:
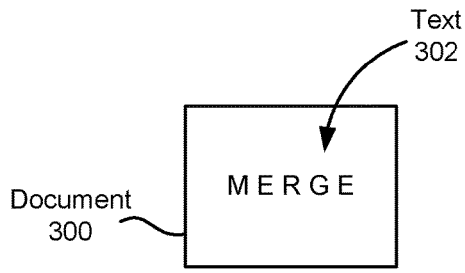
FIG. 3A shows a document according to an example implementation.

FIG. 3A shows a document 300 according to an example implementation. The document 300 may be stored as the document 234 in the memory 220 of the computing system 200. The document 300 may be modified by edits originating in a local computer, such as the computing system 200, or one or more remote computers. The edits to the document may include insertions and/or deletions of strings of text. The current text 302 in the document 300 may include a single word and/or string, "MERGE".

Figure 3B:
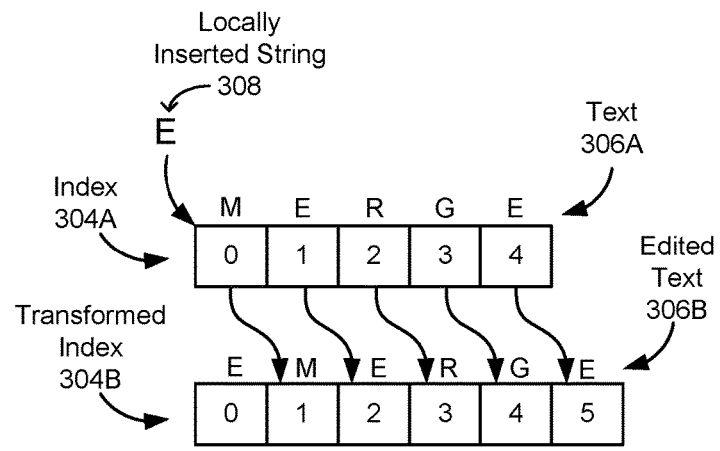
FIG. 3B shows an index and a transformed index after a string has been inserted according to an example implementation.

FIG. 3B shows an index 304A and a transformed index 304B after a string 308 has been inserted according to an example implementation. The string of text 306A, "MERGE," may have previously been inserted into the text 302 of the document 300 shown and described with respect to FIG. 3A. In this example, the text 306A before the insertion is identical to the text 302 shown in FIG. 3A. The indices and/or offsets within the index 304A before the insertion may be 0, 1, 2, 3, and 4, corresponding to the characters M, E, R, G, and E, respectively.

The first computing system 200 may insert a locally inserted string 308, E, before the first letter, M, at location, index, or offset 0. The insertion of the locally inserted string 308E before the first letter may result in edited text 306B, "EMERGE". The index or location of the first letter, E, of the edited text 306B, may have the lowest location, index, or offset, zero (0). Indices, locations, or offsets after the insertion may have their values increased by the length of the locally inserted string 308, one (1). As a result of this increase, the characters, M, E, R, G, and E, may have their respective indices and/or offsets increased from 0, 1, 2, 3, and 4, to 1, 2, 3, 4, and 5, as shown in FIG. 3B.

Figure 3C:
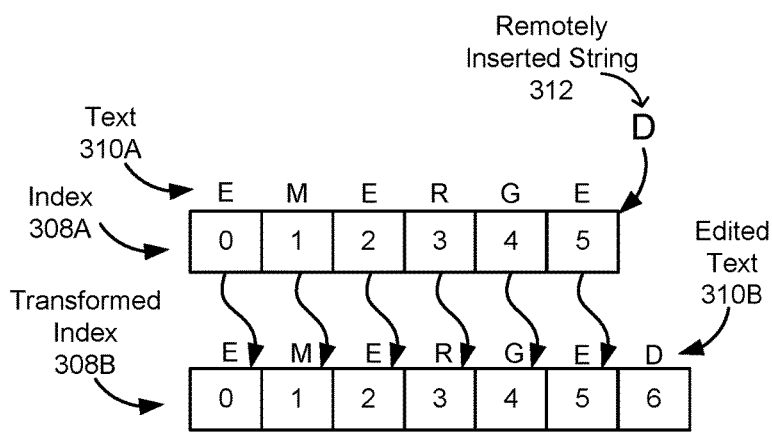
FIG. 3C shows an index and a transformed index after a string has been inserted according to an example implementation.

FIG. 3C shows an index 308A and a transformed index 308B after a string 312 has been inserted according to an example implementation. The string 312 may be a remotely inserted string 312, having been inserted by a remote computing system and/or second computing system. The remote or second computing system may have inserted the remotely inserted string 312 after recognizing the insertion of the locally inserted string 308 by the first or local computing system 200. As a result of the recognition of the insertion of the locally inserted string 308, the text 310A and index 308A may be identical to the edited text 306B and transformed index 304B of FIG. 3B. By appearing in the context (identical text 310A and index 308A) of the edited text 306B and transformed index 304B, the edit which includes the remotely inserted string 312 may be considered to be causally dependent on the edit which includes the locally inserted string 308.

The remote or second computing system may insert the remotely inserted string 312, in this example D, after the last character, which is located at offset or index 5. Because the remotely inserted string 312 is inserted after the last character of the text 310A, the offsets or indices in the transformed index 308B of the characters, E, M, E, R, G, and E, remain the same, 0, 1, 2, 3, 4, and 5, respectively as in the index 308A. The single character of the remotely inserted string, D, acquires an offset or index value of 6, which is one higher than the highest index, 5, of the last character, E.

FIG. 3D shows the index 308A and a transformed index 308C after a string 313 has been inserted according to an example implementation. The local or first computing system may have inserted the remotely inserted string 313 after recognizing and/or processing the insertion of the locally inserted string 308 by the first or local computing system 200. As a result of the recognition and/or processing of the insertion of the locally inserted string 308, the text 310A and index 308A may be identical to the edited text 306B and transformed index 304B of FIG. 3B. By appearing in the context (identical text 310C and index 308C) of the edited text 306B and transformed index 304B, the edit which includes the remotely inserted string 312 may be considered to be causally dependent on the edit which includes the locally inserted string 308.

In this example, the local or first computing system 200 has inserted the locally inserted string 313. In this example, the first computing system 200 has not recognized the remote edit of the remotely inserted string 312 at the time of making the local edit of the locally inserted string 313, and the remote or second computing system had not recognized the local edit of the locally inserted string 313 at the time of making the remote edit of the remotely inserted string 312, making the edits of the inserted strings 312, 313 asymmetric. Because the remotely inserted string 312 does not appear in the text 310A and index 308A of the first or local computing system and the locally inserted string 313 does not appear in the text 310A or index 308A of the second or remote computing system, the inserted strings 312, 313 may be considered to be concurrent. Based on the concurrency and/or the first computing system 200 not having recognized the remote edit of the remotely inserted string 312 and the remote or second computing system not having recognized the local edit of the locally inserted string, the text 310A and index 308A, shown in FIG. 3D and acted upon by the first or local computing system 200, are the same as the text 310A and index 308A shown in FIG. 3C and acted upon by the second or remote computing system, and which resulted from the local edit of the locally inserted string 308 shown in FIG. 3B.

In a similar manner to the example of FIG. 3C, the first six characters, E, M, E, R, G, E, and offsets or indices, 0, 1, 2, 3, 4, 5, remain the same as before the edit of the insertion of the locally inserted string 313. The inserted characters, N, C, and Y, which are inserted after the last character, E, of the text 310, acquire index or offset values of 6, 7, and 8.

As discussed above, the insertions 312, 313 were made without recognition of the other insertion 312, 313. Based on the insertions 312, 313 being made without recognition of the other insertion 312, 313, the indices or offsets of the characters from each insertion 312, 312 are made without knowledge of the changes from the other insertion 312, 313.

FIG. 3E shows an index 314 and text 316 after insertions have been merged according to an example implementation. In this example, a tiebreaker, which may be based on timestamps or priorities of the respective insertions 312, 313, determined that the remotely inserted text, D, would be inserted at offset or index 6 before the insertion of the locally inserted text, NCY. The first or local computing system 200 may, after inserting the text 313, perform an inverse transformation of the transformed index 308C to return the index and text to the values of the index 308A and text 310A before the insertion of the locally inserted string, insert the remotely inserted string, D, at offset or index 6 to result in the edited text 310B and transformed index 308B, and then insert the locally inserted string 313, NCY, resulting in the merged text 316 and merged index 314, with characters, E, M, E, R, G, E, D, N, C, and Y at offsets or indices, 0, 1, 2, 3, 4, 5, 6, 7, 8, and 9, as shown in FIG. 3E.

FIG. 4 shows an edit data structure 400 according to an example implementation. The memory 220 may store local edits 224, remote edits 226, edits in the edit collection 228, edits in the asymmetric edit collection 330, and/or edits in the edits to transmit 232 collection, in the edit data structure 400 format shown in FIG. 4.

The edit data structure 400 may include a declaration 402. The declaration 402 may generate a name for calling and/or instantiating the edit data structure, such as, "Edit". The edit data structure 400 may include a reference 404, which refers to a location in memory 220 where the string associated with the edit (which may be an insertion or deletion) is stored. The edit data structure 400 may include a priority 406. The priority 406 may be associated with the computing system that generated the edit, such as the first or local computing system 200 or the second or remote computing system. The computing systems 102, 104, 110, 112, 114 may use the priority 406 value to determine which edit to perform or apply first. The edit data structure 400 may also include an insertion position 408 and a deletion position 410. If the edit associated with the edit data structure 400 is an insertion, then the insertion position 408 may include the position, location, offset, and/or index value within the document 300 where the insertion is inserted, and a null value for the deletion position. If the edit associated with the edit data structure 400 is a deletion, then the insertion position 408 may include a null value, and the deletion position 410 may include the position, location, offset, and/or index value within the document 300 where the deletion occurs.

An editor state may include a sequence of edit data structures followed by an omnibus string. The omnibus string may be a sequence of characters. The sequence of characters may include characters present in the text 302 of the document 300. The computing system 200 may perform read operations over the editor state by iteratively applying each edit to the text 302, either inserting strings into or deleting strings from the text 302 of the document 300. The read operations may include insert operations and delete operations.

Figure 5:
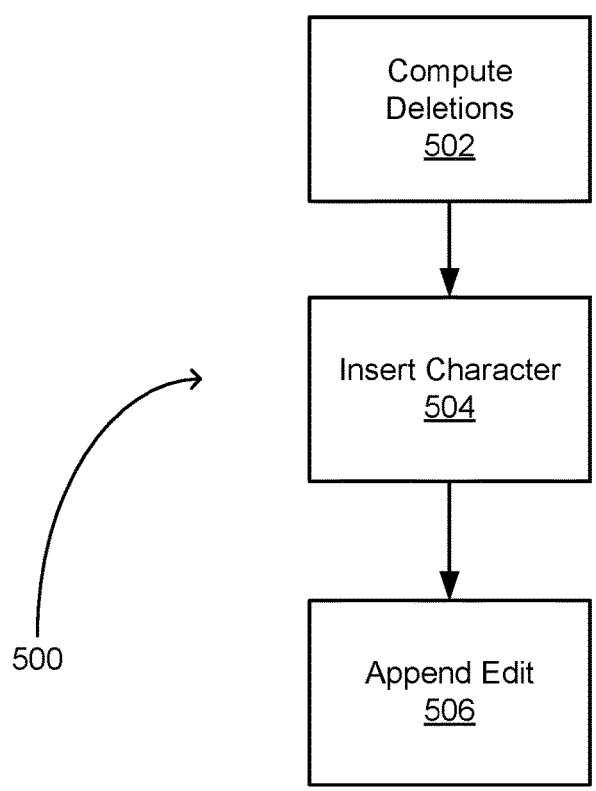
FIG. 5 is a flowchart showing an insert operation according to an example implementation.

FIG. 5 is a flowchart showing an insert operation 500 according to an example implementation. The insert operation 500 may include computing deletions (502). Computing deletions may include removing strings from the text and transforming the index of the text based on the string removals. The insert operation 500 may also include inserting a character(s) (504). The character(s) and/or string may be inserted at a location based on the insertion position value 408 at the transformed index. The insert operation 500 may also include appending the edit (506). Appending the edit (506) may include appending the edit (the insertion) by generating an edit data structure 400 with a unique identifier (reference 404), a priority value 406, a position (408) of the insertion in the transformed index, and a null value for the deletion position 410.

Figure 6:
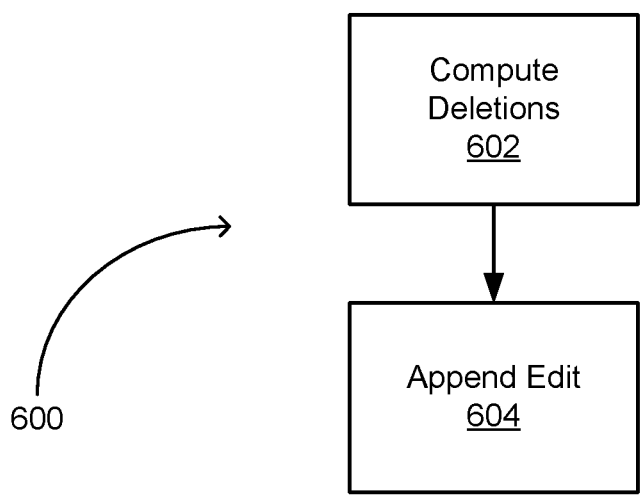
FIG. 6 is a flowchart showing a delete operation according to an example implementation.

FIG. 6 is a flowchart showing a delete operation 600 according to an example implementation. The delete operation 600 may include computing deletions (502). Computing deletions may include removing strings from the text and transforming the index of the text based on the string removals. The delete operation 600 may also include appending the edit (606). Appending the edit (606) may include appending the edit (the deletion) by generating an edit data structure 400 with a unique identifier (reference 404), a priority value 406, a null value for the insertion position (408), and a position (410) of the deletion in the transformed index.

Where edits from different computing systems, such as a first or local computing system 200 and a second or remote computing system, have concurrent edits or read operations and/or edits that occur by one computing system before an edit by the other computing system has been recognized, the computing systems may merge the edits. Merging edits from different computing systems may allow read operations to be performed on edits by different computing systems based on the index values used by the respective computing systems when the respective edits were performed.

Figure 7:
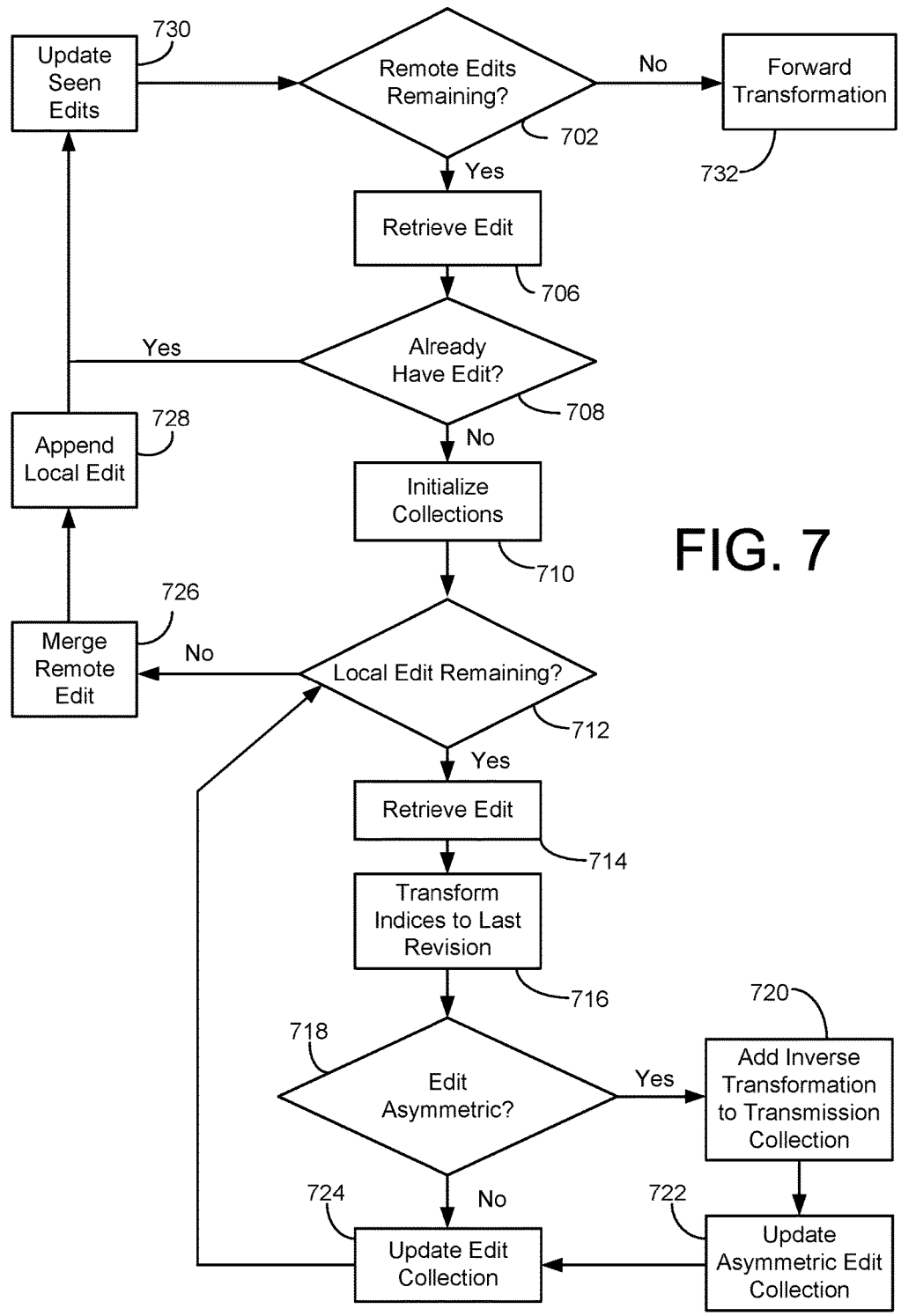
FIG. 7 is a flowchart showing a merge operation according to an example implementation.

FIG. 7 is a flowchart showing a merge operation according to an example implementation. The merge operation may be performed by a first or local computing system 200 with respect to a second or remote computing system, and may be performed by any of the computing systems 102, 104, 110, 112, 114 interacting with any of the other computing systems 102, 104, 110, 112, 114.

The merge operation may include the first or local computing system determining whether there are remote edits remaining to be performed (702). Remote edits may be edits performed by the second or remote computing system which have not yet been performed or applied by the first or local computing system 200. If no remote edits are remaining, then the merge operation may include the first or local computing system performing a forward transformation (732), applying local edits (performed by the first or local computing system 200) to be transmitted to the second or other computing system (ins_list) on the first or local computing system 200.

If remote edits are remaining, then the merge operation may include the first or local computing system 200 retrieving a remote edit (706). The retrieved remote edit may include a first-in-time remote edit and/or a least recent remote edit.

After retrieving the remote edit (706), the merge operation may include the first or local computing system 200 determining whether the first or local computing system 200 already has the remote edit (708), and/or whether the first or local computing system 200 has already performed the edit on the document 300. If the first or local computing system 200 has already seen or performed the remote edit, then the merge operation may include the first or local computing system 200 updating a collection of seen edits (730) to include the remote edit in a collection of edits that the first or local computing system 200 has seen and/or applied.

If the first or local computing system 200 does not already have the remote edit, then the merge operation may include the first or local computing system 200 initializing collections (710). The collections may be unordered sets of edits, stacks from which edits are removed in an opposite order from which the edits were added (first in last out), and/or queues from which edits are removed in a same order from which the edits were added (first in first out). The collections may include a collection S of all local edits by the first or local computing system 200, a collection T of asymmetric local edits by the first or local computing system 200 (and/or edits that have not been seen or recognized by the second or remote computing system), and a collection ins_list of local edits that the first or local computing system 200 will send to the second or remote computing system.

The merge operation may include the first or local computing system 200 determining whether there are local edits remaining (712). If the first or local computing system 200 determines that no local edits are remaining, then the merge operation may include the first or local computing system 200 merging the remote edit (726) and appending the local edits to the text 302 of the document 300. The first or local computing system 200 may merge the remote edit (726) by performing the remote edit (which may be an insertion nor a deletion) on the text 302 of the document 300 and transforming the indices of the document based on the remote edit. The first or local computing system 200 may append the local edits by performing the local edits (which may be insertions or deletions) and transforming the indices of the document based on the local edits.

If the first or local computing system 200 determines that there is at least one local edit remaining, then the merge operation may include the first or local computing system 200 retrieving a local edit (714). The first or local computing system 200 may retrieve a most recent local edit.

After retrieving the local edit (714), the merge operation may include the first or local computing system 200 transforming the indices to a last revision (716), bringing the text and indices to a state before the retrieved local edit. The first or local computing system 200 may, for example, remove inserted text and perform an inverse transformation to return indices to a state before the insertion (or add deleted text and perform an inverse transformation to return indices to a state before the deletion). For example, an inverse transformation of the transformed index 308C shown in FIG. 3D would return the indices to those shown as indices 308A. By transforming the indices to a last revision (716) for each local edit (712), the first or local computing system 200 may reverse the local edits and associated index transformations, allowing the first or local computing system 200 to apply the remote edits at indices utilized by the second or remote computing system.

After transforming the indices to their state before the last revision (716), the merge operation may include the recognition determiner 216 of the first or local computing system 200 determining whether the local edit is asymmetric (718), such as based on whether the local edit was recognized by the second or remote computing system (718). The recognition determiner 216 may determine whether the local edit was recognized by the second or remote computing system based on whether the first or local computing system 200 has received an acknowledgment of the local edit from the second or remote computing system, based on a time elapsed since the first or local computing system 200 sent the local edit to the second or remote computing system, or based on a most recent version of the text 302 and/or document 300 received by the first or local computing system 200 from the second or remote computing system, as non-limiting examples.

If the first or local computing system 200 determines that the edit was recognized by the second or remote computing system and/or is symmetric, then the merge operation may include the first or local computing system 200 updating an edit collection (724). The first or local computing system

200 may update the edit collection (724) by adding the local edit to the collection S of local edits.

If the first or local computing system 200 determines that the local edit was not recognized by the second or remote computing system and/or is asymmetric, then the merge operation may include the first or local computing system 200 adding an inverse transformation of the local edit to the transmission collection ins_list (720). The second or remote computing system may use the transmission collection ins_list to perform inverse transformations of the document 300 to bring the document to a state before the local edits, and then apply the local edits to the document 300.

After adding the inverse transformation to the transmission collection (720), the merge operation may include the first or local computing system 200 updating the asymmetric edit collection T (722). The first or local computing system 200 may add the local edit to the asymmetric edit collection T. The merge operation may also include the first or local computing system 200 updating the edit collection (724) regardless of whether the local edit was recognized by the second or remote computing system. The first or local computing system 200 may update the edit collection S (724) by adding the local edit to the edit collection S.

After updating the edit collection (724), the merge operation may include the first or local computing system 200 determining whether local edits are remaining (712), retrieving the local edits (714), transforming the indices to the last revision (716), determining whether the local edit has been recognized by the second or remote computer (718), adding the inverse transformation to the transmission collection (720), updating the asymmetric edit collection (722), and/or updating the edit collection (724) until no more local edits are remaining. After no more local edits are remaining for a given remote edit, the merge operation may include merging the remote edit (726), appending the local edit (728), and updating seen edits (730) (a collection of remote edits performed by the second or remote computing system) by adding the remote edit to the seen edit until no remote edits are remaining. After no remote edits are remaining, the forward transformation may be performed based on the seen edits and the local edits, and the first or local computing system 200 may send the collection of inverse transformations ins_list and collection of asymmetric edits T to the second or remote computing system. The merge operation described herein with respect to FIG. 7 may reduce the number of procedures and/or iterations from O(n) in merge operations such as described by Chengzheng Sun and Clarence Ellis in "Operational Transformation in Real-Time Group Editors: Issues, Algorithms, and Achievements" (Proc. of 1998 ACM Conference on Computer-Supported Cooperative Work, Seattle, USA, Nov. 14-18, 1998, pp. 59-68), to O(log(n)), where n is the number of local edits performed by this computing system 200 which have not been recognized by the second computing system.

Figure 8:
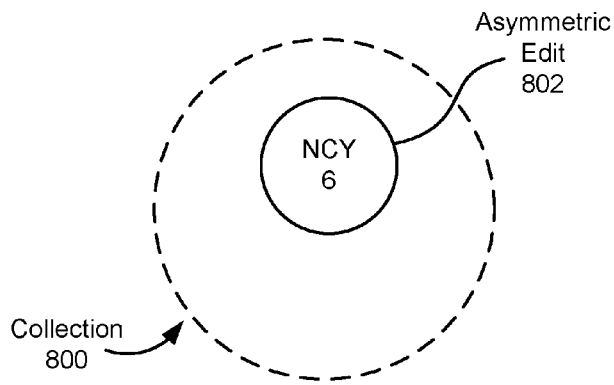
FIG. 8 shows a collection of asymmetric edits according to an example implementation.

FIG. 8 shows a collection T 800 of asymmetric edits 802 according to an example implementation. While one asymmetric edit 802 is shown in FIG. 8, many more than one asymmetric edit 802 may be included in the collection 800. The collection updater 218 may have added the asymmetric edit 802 to the collection 800 at (722) during the merge operation. In this example, the asymmetric edit 802 is based on the locally inserted string 313 shown in FIG. 3D, and includes the string, "NCY" at offset, position, or index 6.

Figure 9:
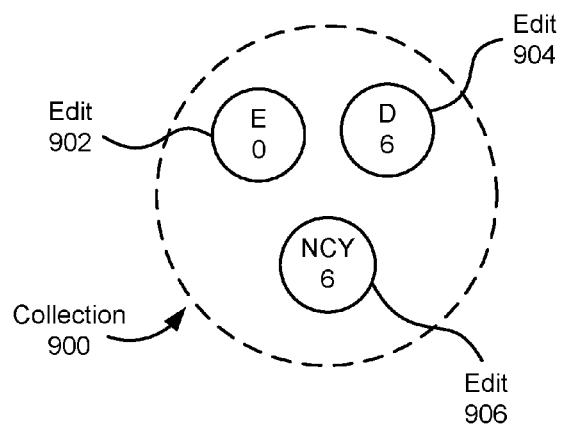
FIG. 9 shows a collection of edits according to an example implementation.

FIG. 9 shows a collection S 900 of edits 902, 904, 906 according to an example implementation. While three edits 902, 904, 906 are shown in FIG. 9, any number of edits 902, 904, 906 may be included in the collection 900. The collection updater 218 may have added the edits 902, 904, 906 at (724) during the merge operation. In this example, the edit 902 is based on the locally inserted string 380 shown in FIG. 3B, and includes the string, "E" at offset, position, or index 0. The edit 904 is based on the remotely inserted string 312 shown in FIG. 3C, and includes the string, "D" at offset, position, or index 6. The edit 906 is based on locally inserted string 313, and includes the string, "NCY" at offset, position, or index 6.

Figure 10:
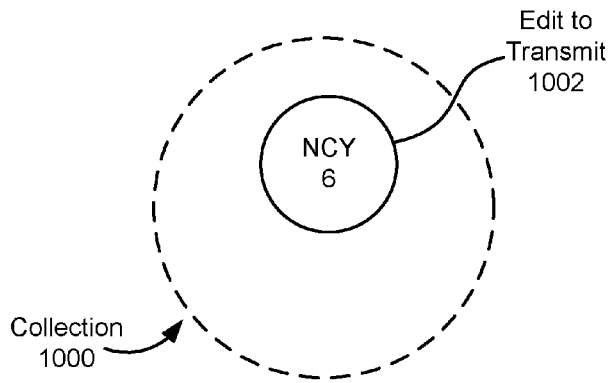
FIG. 10 shows a collection of edits to transmit according to an example implementation.

FIG. 10 shows a collection ins_list 1000 of edits 1002 to transmit according to an example implementation. While one edit 1002 is shown in FIG. 10, many more than one edit 1002 may be included in the collection 1000. The collection updater 218 may have added the edit to transmit 1002 during (720) of the merge operation. In this example, the edit 1002 is based on the locally inserted string 313 shown in FIG. 3D, and includes the string, "NCY" at offset, position, or index 6.

Figure 11:
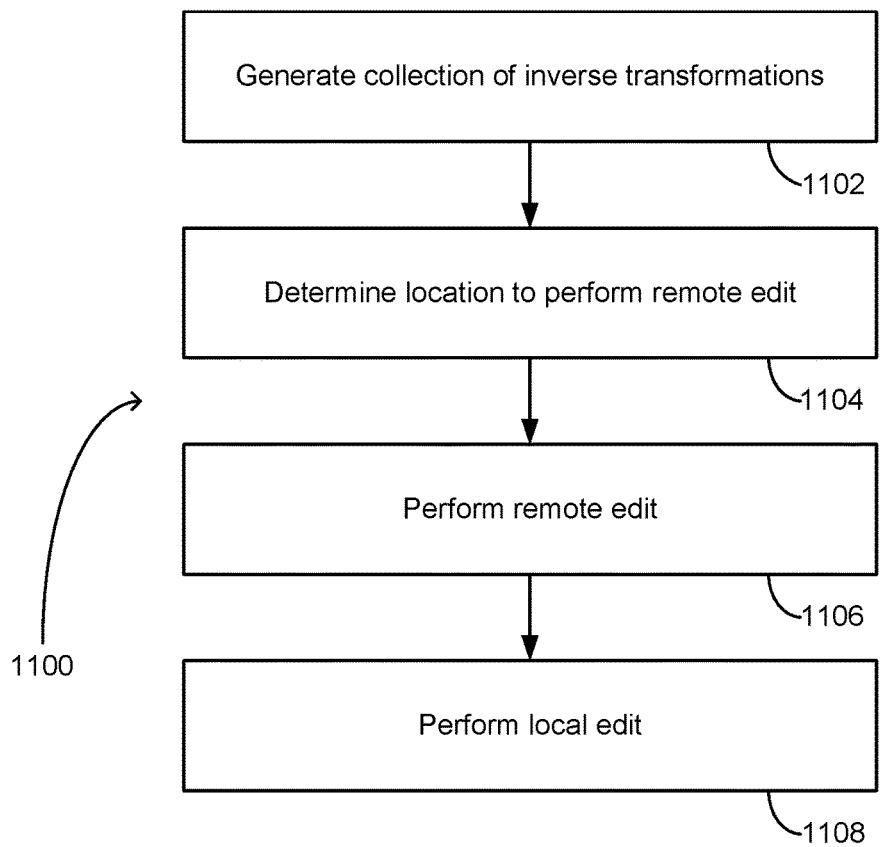
FIG. 11 is a flowchart showing a method for maintaining a current state of a document that is concurrently being edited by at least a first user associated with a first computing system and a second user associated with a second computing system.

FIG. 11 is a flowchart showing a method 100 for maintaining a current state of a document 300 that is concurrently being edited by at least a first user associated with a first computing system 200 and a second user associated with a second computing system. The method 1100 may include a collection updater 218 generating a collection of inverse transformations of an index of the document, the collection of inverse transformations being based on at least one asymmetric local edit to the document by the first computing system (1102). The method 1100 may also include a merger 208 determining a location within the document to perform a remote edit by the second computing system based on the collection of inverse transformations of the index of the document (1104). The method 1100 may also include an edit iterator 210 performing the remote edit to the document at the determined location based on the remote edit by the second computing system (1106). The method 1100 may also include the edit iterator 210 performing at least one local edit to the document based on the at least one asymmetric local edit to the document by the first computing system.

According to an example, the inverse transformations may include offsets identifying locations within the document.

According to an example, the collection of inverse transformations of the index of the document may include an unordered set of inverse transformations of the index of the document.

According to an example, the collection of inverse transformations of the index of the document may include a stack of inverse transformations of the index of the document, the inverse transformations having an order in the stack based on a chronological order in which the inverse transformations were added to the stack.

According to an example, the method 1100 may further include determining that the at least one asymmetric local edits is asymmetric based on whether the second computing system has recognized the at least one local edit to the document by the first computing system.

According to an example, the method 1100 may further include determining that the at least one asymmetric local edits is asymmetric based on whether the first computing system has received an acknowledgment of the at least one local edit to the document by the first computing system.

According to an example, the at least one local edit may be based on the at least one asymmetric local edit to the document by the first computing system is performed after the edit based on the remote edit to the document.

According to an example, the remote edit may be represented by a data structure 400 including an identifier 404 that references a string inserted or deleted, a priority identifier 406 that is used determine which of concurrent edits to perform first, an indicator 408, 410 of whether the remote edit is an insertion or a deletion, and the location 408, 410 within the document where the insertion or deletion occurred.

According to an example, the at least one local edit and the remote edit may include insertions of strings of characters.

According to an example, the at least one local edit and the remote edit may include removals of strings of characters.

According to an example, the inverse transformations in the collection of inverse transformations may not reference any of the other inverse transformations.

Figure 12:
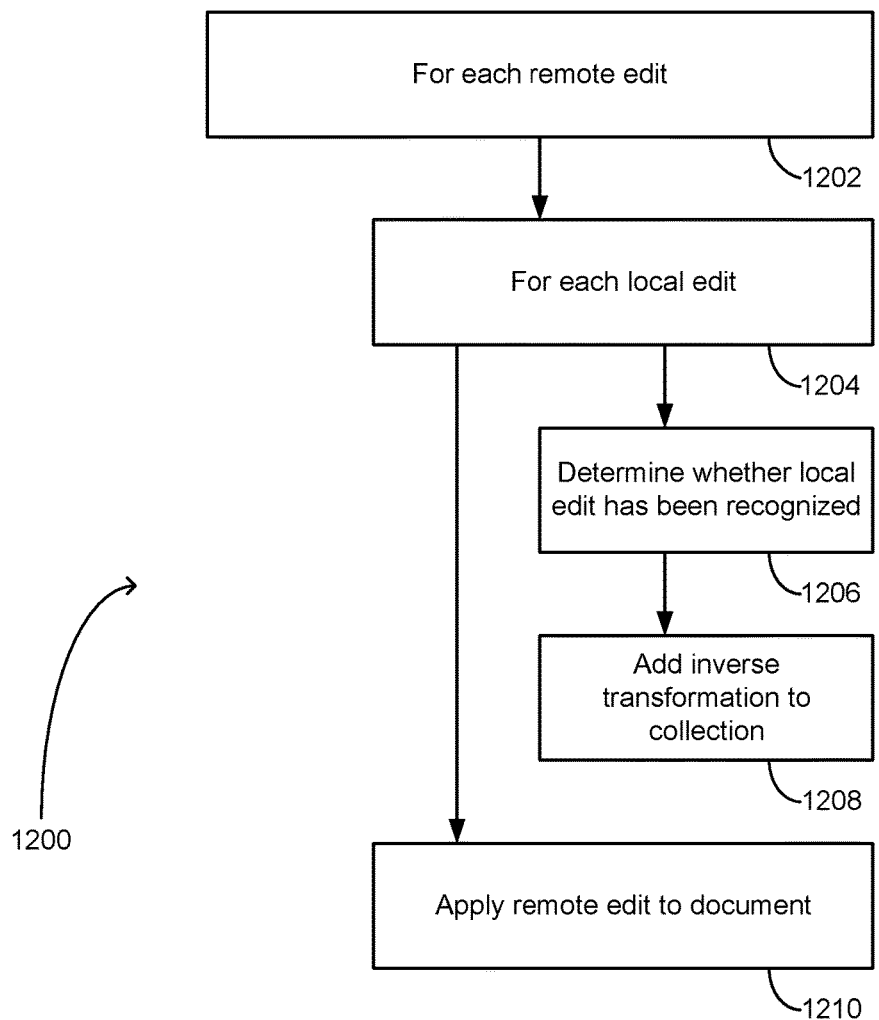
FIG. 12 is a flowchart showing a method for maintaining a current state of a document that is concurrently being edited by at least a first user associated with a first computing system and a second user associated with a second computing system.

FIG. 12 is a flowchart showing a method 1200 for maintaining a current state of a document 300 that is concurrently being edited by at least a first user associated with a first computing system 200 and a second user associated with a second computing system. The method 1200 may include, for each of multiple remote edits of the document received from the second computing system that have not already been applied the document by the first computer (1202), for each of multiple local edits to the document performed by the first computing system (1204), determine whether the local edit to the document performed by the first computing system has been recognized by the second computing system (1206), and if the local edit to the document performed by the first computing system has not been recognized by the second computing system, add an inverse transformation of the local edit to the document performed by the first computing system to a collection of unrecognized edits (1208). For each remote edit (1202), the method 1200 may also include applying the remote edit to the document at a location determined based on based on an original location of the remote edit and the inverse transformations included in the collection of unrecognized edits (1210).

According to an example, each local edit and remote edit may be represented by a data structure 400 including an identifier 404 that references a string inserted or deleted, a priority identifier 406 that is used determine which of concurrent edits to perform first, an indicator 408, 410 of whether the edit is an insertion or a deletion, and the location 408, 410 within the document where the insertion or deletion occurred.

According to an example, the method 12 may further include, for each of the multiple local edits to the document performed by the first computing system 200, adding an inverse transformation of the local edit to a collection of edits.

According to an example, the local edits may be insertions into the document.

According to an example, the local edits may be deletions from the document.

Figure 13:
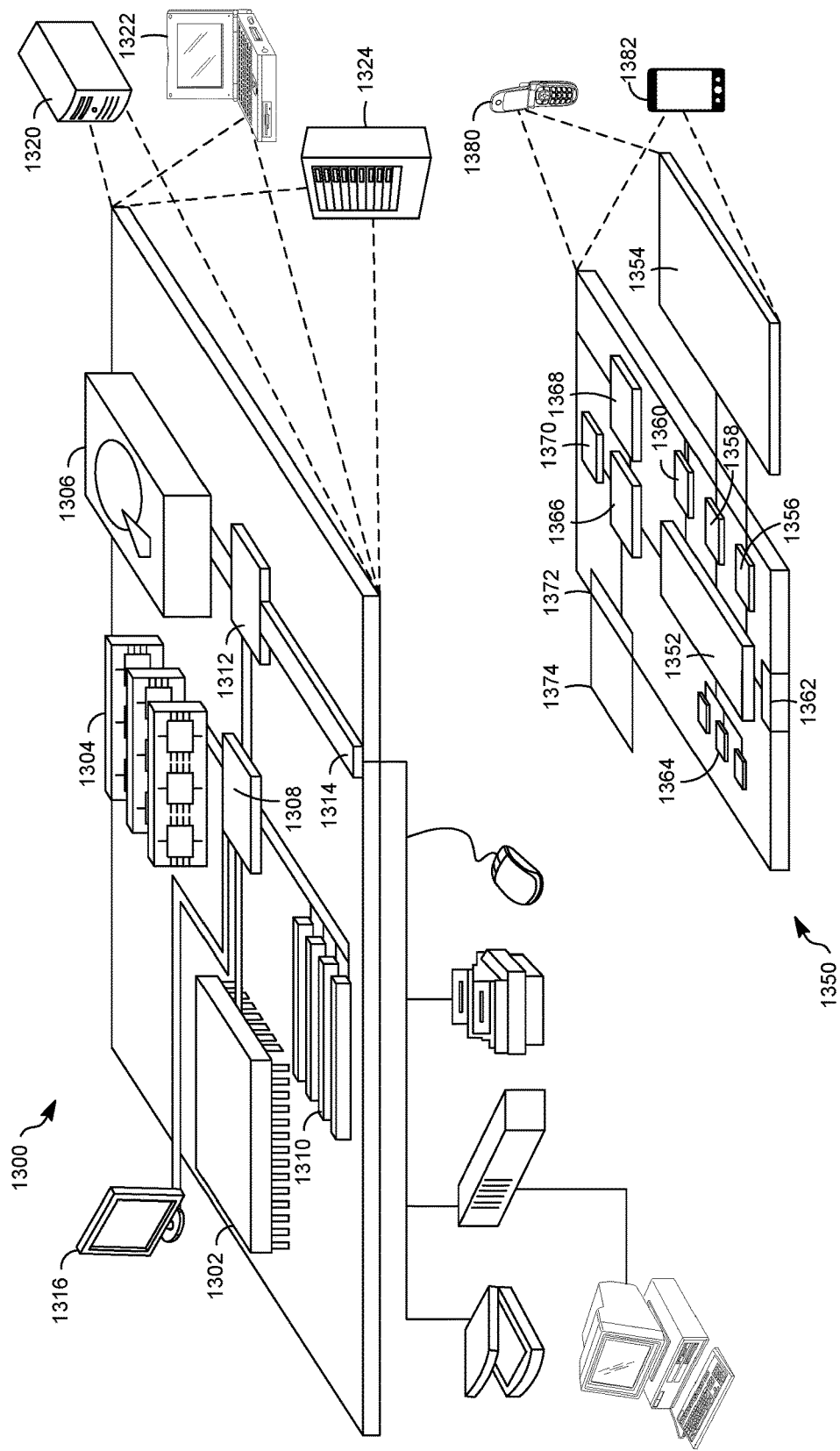
FIG. 13 shows an example of a computer device and a mobile computer device that can be used to implement the techniques described here.

FIG. 13 shows an example of a generic computer device 1300 and a generic mobile computer device 1350, which may be used with the techniques described here. Computing device 1300 is intended to represent various forms of digital computers, such as laptops, desktops, tablets, workstations, personal digital assistants, televisions, servers, blade servers, mainframes, and other appropriate computing devices. Computing device 1350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. The processor 1302 can be a semiconductor-based processor. The memory 1304 can be a semiconductor-based memory. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smart phone 1382, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon for maintaining a current state of a document that is concurrently being edited by at least a first user associated with a first computing system and a second user associated with a second computing system, the instructions, when executed by at least one processor, being configured to cause the first computing system to at least:

in response to receiving a remote edit from the second computing system that has not been performed by the first computing system, generate a collection of inverse transformations of an index of the document, the generating the collection of inverse transformations including:

determining that at least one local edit remains to be added to a collection of local edits;

determining that the at least one local edit is asymmetric; and adding an inverse transformation of the at least one asymmetric local edit to the collection of inverse transformations;

determine a location within the document to perform the remote edit by the second computing system based on the collection of inverse transformations of the index of the document;

perform the remote edit to the document at the determined location based on the remote edit by the second computing system; and perform at least one local edit to the document based on the collection of local edits.

2. The non-transitory computer-readable storage medium of claim 1, wherein the inverse transformations include offsets identifying locations within the document.

3. The non-transitory computer-readable storage medium of claim 1, wherein the collection of inverse transformations of the index of the document includes an unordered set of inverse transformations of the index of the document.

4. The non-transitory computer-readable storage medium of claim 1, wherein the collection of inverse transformations of the index of the document includes a stack of inverse transformations of the index of the document, the inverse transformations having an order in the stack based on a chronological order in which the inverse transformations were added to the stack.

5. The non-transitory computer-readable storage medium of claim 1, wherein the instructions are further configured to cause the first computing system to determine that the at least one asymmetric local edit is asymmetric based on whether the second computing system has recognized the at least one local edit to the document by the first computing system.

6. The non-transitory computer-readable storage medium of claim 1, wherein the instructions are further configured to cause the first computing system to determine that the at least one asymmetric local edit is asymmetric based on whether the first computing system has received an acknowledgment of the at least one local edit to the document by the first computing system.

7. The non-transitory computer-readable storage medium of claim 1, wherein the at least one local edit based on the collection of local edits is performed after the edit based on the remote edit to the document.

8. The non-transitory computer-readable storage medium of claim 1, wherein the remote edit is represented by a data structure including an identifier that references a string inserted or deleted, a priority identifier that is used to determine which of multiple concurrent edits to perform first, an indicator of whether the remote edit is an insertion or a deletion, and the location within the document where the insertion or deletion occurred.

9. The non-transitory computer-readable storage medium of claim 1, wherein the at least one local edit and the remote edit include insertions of strings of characters.

10. The non-transitory computer-readable storage medium of claim 1, wherein the at least one local edit and the remote edit include removals of strings of characters.

11. The non-transitory computer-readable storage medium of claim 1, wherein the inverse transformations in the collection of inverse transformations do not reference any of the other inverse transformations.

12. A non-transitory computer-readable storage medium comprising instructions stored thereon for maintaining a current state of a document that is concurrently being edited by at least a first user associated with a first computing system and a second user associated with a second computing system, the instructions, when executed by at least one processor, being configured to cause the first computing system to at least:

for each of multiple remote edits of the document received from the second computing system that have not already been applied to the document by the first computer:

for each of multiple local edits to the document performed by the first computing system:

determine whether the local edit to the document performed by the first computing system has been recognized by the second computing system; and if the local edit to the document performed by the first computing system has not been recognized by the second computing system, add an inverse transformation of the local edit to the document performed by the first computing system to a collection of unrecognized edits; and perform the inverse transformation(s) included in the collection of unrecognized edits on the document;

apply the remote edit to the document at a location determined based on an original location of the remote edit and the inverse transformations performed based on the collection of unrecognized edits; and perform each of the multiple local edits to the document.

13. The non-transitory computer-readable storage medium of claim 12, wherein each local edit and remote edit is represented by a data structure including an identifier that references a string inserted or deleted, a priority identifier that is used to determine which of concurrent edits to perform first, an indicator of whether the edit is an insertion or a deletion, and the location within the document where the insertion or deletion occurred.

14. The non-transitory computer-readable storage medium of claim 12, wherein the instructions are further configured to cause the first computing system to, for each of the multiple local edits to the document performed by the first computing system, add an inverse transformation of the local edit to a collection of edits.

15. The non-transitory computer-readable storage medium of claim 12, wherein the local edits are insertions into the document.

16. The non-transitory computer-readable storage medium of claim 12, wherein the local edits are deletions from the document.

17. A method for maintaining a current state of a document that is concurrently being edited by at least a first user associated with a first computing system and a second user associated with a second computing system, the method comprising the first computing system performing at least:

in response to receiving a remote edit from the second computing system that has not been performed by the first computing system, generating a collection of inverse transformations of an index of the document, the generating the collection of inverse transformations including:

determining that at least one local edit remains to be added to a collection of local edits;

determining that the at least one local edit is asymmetric; and adding an inverse transformation of the at least one asymmetric local edit to the collection of inverse transformations;

determining a location within the document to perform a remote edit by the second computing system based on the collection of inverse transformations of the index of the document;

performing the remote edit to the document at the determined location based on the remote edit by the second computing system; and performing at least one local edit to the document based on the collection of local edits.

18. The method of claim 17, wherein the inverse transformations include offsets identifying locations within the document.

19. The method of claim 17, wherein the at least one local edit based on the at least one asymmetric local edit to the document by the first computing system is performed after the remote edit to the document.

20. The method of claim 17, wherein the remote edit is represented by a data structure including an identifier that references a string inserted or deleted, a priority identifier that is used to determine which of multiple concurrent edits to perform first, an indicator of whether the remote edit is an insertion or a deletion, and the location within the document where the insertion or deletion occurred.

21. The method of claim 17, wherein the inverse transformations in the collection of inverse transformations do not reference any of the other inverse transformations.

\* \* \* \* \*